April 24, 1951 G. S. DOMAN 2,550,538
DIRECTIONAL AND TRIM CONTROL FOR ROTARY WING AIRCRAFT
Filed Aug. 9, 1946
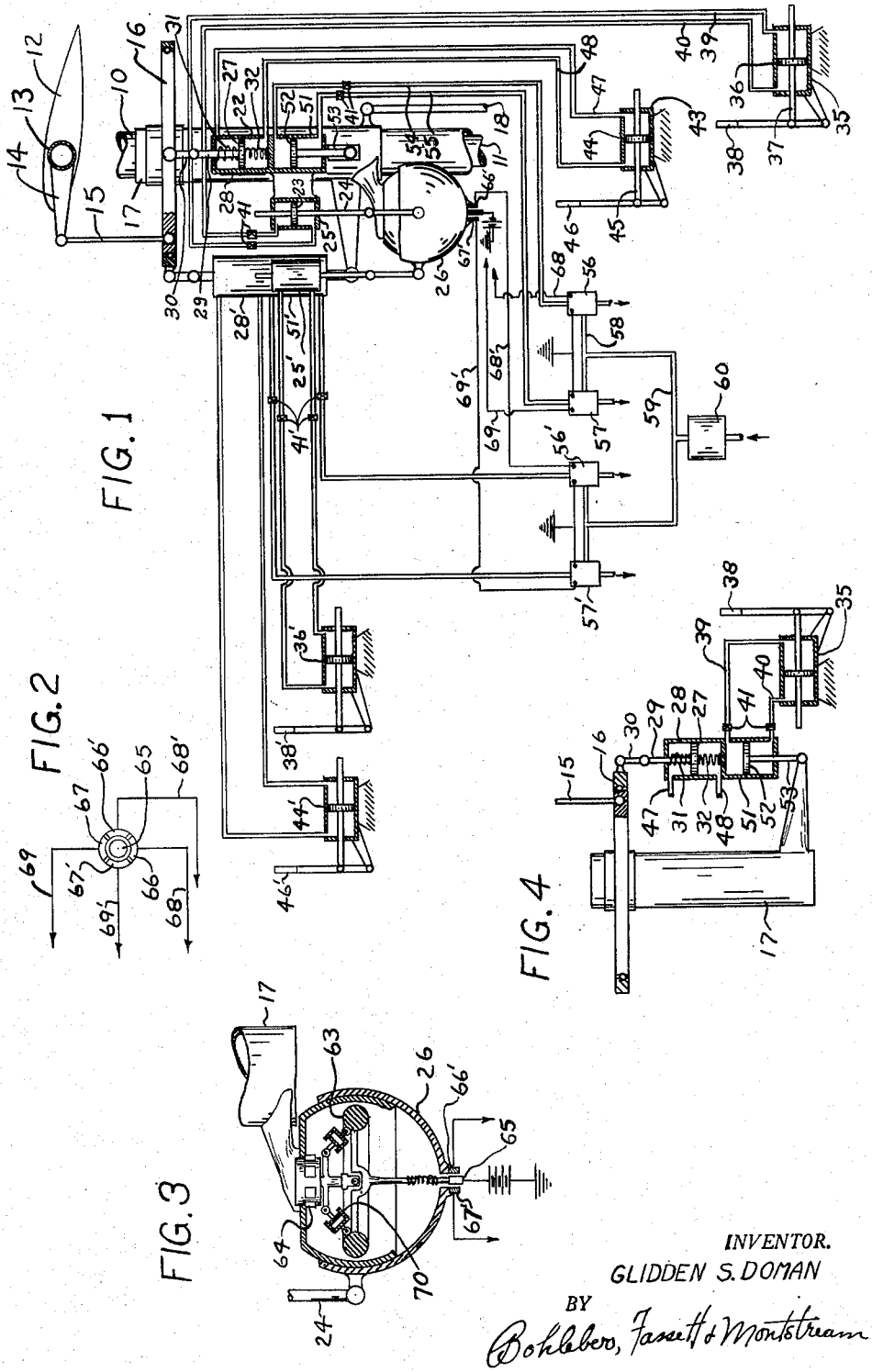
INVENTOR.
GLIDDEN S. DOMAN
BY
Bohleber, Fassett & Montstream
ATTORNEYS Patented Apr. 24, 1951

2,550,538

UNITED STATES PATENT OFFICE 2,550,538

DIRECTIONAL AND TRIM CONTROL FOR ROTARY WING AIRCRAFT

Glidden S. Doman, Stratford, Conn., assignor to Doman Helicopters, Inc., a corporation of Delaware Application August 9, 1946, Serial No. 689,458

22 Claims. (Cl. 244—17.13)

The invention relates to a directional and trim control for rotary wing aircraft having wings or blades mounted for change of their pitch. The construction in its more detailed form also includes a gyroscopic stabilizing means to automatically maintain the azimuth plate in fixed trim position in space as determined by a gyroscope throughout short term variations in the attitude of the fuselage but which changes the azimuth plate trim position according to long term change of fuselage attitude.

It is an object of the invention to construct a new and novel trim and directional control for rotary wing aircraft.

Another object is to construct a trim and directional control which exerts a centering force so that the pilot can feel in the stick, the extent of directional pitch change of the wings or blades.

A still further object is to provide a new and novel gyroscopic control of the azimuth plate trim of a rotary wing aircraft.

Another object is to construct a trim and directional control in which the directional control is superimposed upon a trim control and gyroscopic means automatically maintains the trim control throughout minor fuselage motions.

Other objects of the invention will be more apparent from the following description when taken in connection with the accompanying drawings illustrating a preferred embodiment of the invention in which:

Figure 1 is a diagrammatic view of the control for a rotary wing aircraft.

Figure 2 is an enlarged partial view of gyroscopically controlled switches for the trim control.

Figure 3 is a section through the gyroscope.

Figure 4 is a view showing a simplified construction without gyroscopic control.

In the piloting of previous rotary wing aircraft such as helicopters which utilize cyclic pitch change of the wings or blades in order to control direction and speed of flight, the pilot is required to constantly overcome varying trim forces which are exerted against the stick. In addition the trim position of the stick will vary during any accelerations of the craft and for every change in the center of gravity of the loaded aircraft. It is desirable that a central or a neutral position be maintained for the stick irrespective of the trim or acceleration conditions of the aircraft to aid the pilot in intentional maneuvering. The invention herein corrects for these difficulties encountered by a pilot and in addition thereto provides a simple mechanism for accomplishing these results.

In a rotary wing aircraft, the rotor head is mounted upon the aircraft in any suitable fashion and usually it is mounted upon a hollow mast 10 which is secured to the fuselage. A drive shaft 11 may extend through the hollow mast 10 and rotate the rotor head. The rotor head includes a plurality of wings or blades 12, one of which is shown, each mounted upon a shaft 13 coextensive with the longitudinal axis of the wing for pitch change of the latter. The shaft may be connected by an arm 14 to one end of a connecting link 15. The other end of the link is connected with an azimuth plate 16 which is mounted upon the mast in known manner for universal inclination in any direction.

Inclination of the azimuth plate provides for cyclic change of pitch of the wings of the rotor head as the head is rotated. Collective change of the pitch of the rotary wings of the aircraft is usually provided also, and for this purpose a sleeve 17 may be slidably mounted upon the mast 10 and moved vertically thereon by means of suitable operating mechanism, not shown, but connected with the link 18. With a rotor head which is constructed for collective pitch control, the trim and directional control to be described herein is mounted together with the azimuth plate 16 upon the sleeve 17.

The trim and directional control comprises a pair of operating means each being located or spaced 90° with respect to each other from the axis of the mast. This pair of operating means is therefore able to incline the azimuth plate in any direction for cyclic pitch control of the wings or blades of the rotor head. Since each operating means is a duplicate of the other, one only will be described in detail.

The operating means includes a trim control member 22 which is moved upwardly and downwardly with respect to the sleeve 17 and the aircraft. The trim control member, in its more detailed form as illustrated, embodies three distinct control means, particularly shown as three hydraulic cylinders, the construction and operation of which will appear hereinafter. The three control means are a manually operable direction control, a manually operable trim adjustment and a gyroscopically operated means for maintaining trim.

The trim adjustment preferably is an hydraulic cylinder 25 forming a part of the trim control member 22 in which there is a fluid piston 23. The piston is connected by a piston rod 24 to the sleeve 17 or a suitable extension thereof. When gyroscopic control is provided as well, the piston rod 24 is connected with the sleeve 17 through a gyroscopic cage, ring or sphere 26 which is carried by the sleeve 17, and an additional actuating cylinder 51 which responds to a changed position of the cage 26 as will appear more fully hereinafter. Upon the introduction of fluid pressure into either end of the cylinder 25, the piston 23 moves upwardly or downwardly within the cylinder and changes the inclination of the cage 26 relative to the azimuth plate and in turn directs fluid into the cylinder 51 which raises or lowers the control means 22, tilting the azimuth plate relatively to the mast. A simple form is shown in Figure 4 without gyroscopic control and in which the piston is directly connected with the sleeve 17 as will be described hereinafter.

A directional control member 27 operates from the trim control member 22. This member preferably is an hydraulic piston 27 operating in a cylinder 28 forming a part of the trim control member 22. The piston 27 is connected through its piston rod 29 and a link 30 with the azimuth plate 16. Spring means are provided to centralize the directional control member or piston 27 with respect to the trim control member. This spring means may be of any suitable form, that illustrated including a spring 31 between the piston 27 and one end of the cylinder 28 and a second spring 32 extending between the piston 27 and the other end of the cylinder 28. This spring means centralizes the piston 27 with respect to the cylinder or the trim control member 22.

Manually operable means are provided for both the trim control and the directional control. With hydraulic or fluid operating means, the manually operable trim control means includes a fluid cylinder 35 which is fixed to the aircraft. This cylinder contains a piston 36 connected by a piston rod 37 to a trim control handle 38. One end of the cylinder 35 is connected by a pipe 39 to one end of the cylinder 25 and the other end of the cylinder by a pipe 40 to the other end of the cylinder 25. Irreversible valves 41 are provided preferably close to cylinder 25 in each pipe for safety in the event that there is a fluid line failure. Moving of the control handle forces fluid from the cylinder 35 into the cylinder 25 and moves the piston 23 therein which in turn adjusts the position of the cage 26, or moves the control means 22 directly if gyroscopic control is not provided.

Manually operable direction control means is provided which is preferably hydraulic and includes a cylinder 43 having a piston 44 which is connected by a piston rod 45 to a directional control handle 46. One end of the cylinder 43 is connected by a pipe 47 to one end of the cylinder 28 and the other end of the cylinder is connected by a pipe 48 to the other end of the cylinder 28. Movement of the handle 46 forces fluid from cylinder 43 into cylinder 28 and moves the directional control member or piston 27 against the compression of the spring means and changes the inclination of the azimuth plate.

The directional and trim control will preferably include a gyroscopic stablizing control for automatically maintaining the trim inclination of the azimuth plate fixed in space regardless of short term variations in attitude of the fuselage or aircraft. The gyroscopic control preferably is a fluid system including a cylinder 51 forming a part of the trim control member 22 and having a fluid piston 52 therein carried by a piston rod 53 which is secured to the sleeve 17 or a suitable extension thereof. Each end of the cylinder 51 is connected by pipes 54 and 55 to valves 56 and 57 respectively which may be electrically operated. The valves are connected by pipes 58 and 59 to a fluid pump 60.

The electrically operated valves are opened or closed by gyroscopic means which includes a gyroscopic member 63 which is independently rotated by any desirable means such as a motor 64. A gyroscopic means may be provided for each operating means; however, it is simpler to use a single gyroscopic means to serve both operating means. For single gyroscopic means, the gyroscopic member controls two pairs of switches which are carried by the universally mounted cage ring or sphere 26. One pair of switches controls the operation of one pair of valves 56 and 57 and the other pair of switches controls the operation of valves 56' and 57'. The switches may include a contact 65 resiliently carried by or movable with the gyroscopic member and contacts 66 and 67 on each side thereof, each being connected by wires 68 and 69 to its respective valve 56 and 57. At right angle to the contacts 66 and 67 are like switch contacts 66' and 67' which are connected with their counterpart valves 56' and 57'. These switch contacts are placed close to the gyroscopic contact 65 so that any change in the attitude of the aircraft closes one or two of the switch contacts which are adjacent to each other.

The gyroscopic member is damped by suitable friction or dash pot dampers 70 at right angles to each other. The dampers are adjusted for soft operation, that is the gyroscope is insensitive or substantially insensitive to short term changes in attitude of the aircraft but the dampers are stiff enough to cause the gyroscopic member to gradualy assume a new plane of rotation or reference plane perpendicular to the mast 10 upon long term change of attitude of the craft and the azimuth plate will be adjusted to a new trim position comparable to such change in the plane of rotation of the gyroscopic member.

If a short term change in attitude of the aircraft should occur such as by gustiness and the like, the gyroscopic member 63 maintains its position untilted in space so that one or more switch contacts are closed. This opens the valve or valves connected with the switch contact or contacts and forces fluid into one end of the cylinder 51 or its counterpart cylinder 51' to adjust the position of its respective trim control member 22 and thereby maintains the azimuth plate 16 in its position relative to the gyroscopic member or in fixed position in space. Upon adjustment of the trim position of the azimuth plate, the cage and switch contacts again assumes a neutral position with respect to the gyroscopic member whereupon the respective fluid valve or valves close and the rotor remains in adjusted trim position.

The operation of the complete control will be described. In order to obtain trim of the aircraft, the handle 38 or its counterpart 38' is or both handles are operated which forces fluid from the cylinder 35 into the cylinder 25 or its counterpart cylinder 25' or both cylinders which moves the piston 23 and hence the gyroscope cage 26, since the trim control member 22 is held stationary by the fluid in the cylinder 51. This cage motion closes a switch such as 67 and admits fluid to cylinder 51, tilting the azimuth plate through the springs 31 and 32 while cage 26 is also returned to normal position with respect to the gyroscope 63. When desired trim angle has developed in the azimuth plate, the new position of the cage opens the switches and thereby halting the motion. With the aircraft trimmed as desired, the handles 38 and 38' are locked in adjusted position and the trim control member 22 remains in trim adjusted position. Thereafter the gyroscopic means operates to maintain trim of the aircraft as described above. It is to be understood that the handles 38 and 38' may be a single lever universally mounted in known fashion to operate either or both pistons 36 or 36' as desired.

For directional control, the pilot operates the handle 46 or its counterpart 46' or both handles which introduces fluid from the cylinder 43 into its respective cylinder 28 or 28' which moves the piston 27 in its cylinder 28 against the compression of the spring means. The azimuth plate 13 is inclined by the movement of the piston 27 to cyclically vary the pitch of the wings which inclination is in addition to the inclination initially provided by the trim control means. It will be observed that the pilot, in maneuvering the aircraft, operates against the spring means so that the amount of directional control or inclination applied to the azimuth plate will be felt in the stick when maneuvering or flying. It is to be understood also that the handles 46 and 46' may be a single handle universally mounted to operate the piston 44 and 44' or both as desired. The craft may also be flown and maneuvered with the trim control devices with no recourse to the regular directional control. This fact provides a safety factor against any fluid line failure.

Figure 4 shows a simplified construction without gyroscopic control, its cylinder 25 and associated mechanism. The manual trim control cylinder 35 is shown connected with the cylinder 51 for direct adjustment of the trim control member 22. In other words when gyroscopic control is not provided, the manual control cylinder 35 may be directly connected with the cylinder 51 or this may be expressed also as the cylinder 25 of Figure 1 may be substituted for the cylinder 51.

This invention is presented to fill a need for improvements in a directional and trim control. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A trim and directional control for rotary wing aircraft having a universally inclinable azimuth plate device for pitch control of the wings comprising operating means adapted to be connected between a fixed part of the aircraft and the azimuth plate, the operating means including a movable trim control member, a directional control member adapted to be connected with the azimuth plate, spring means engaging the movable trim control member and the directional control member to move the latter through the spring means upon movement of the former member, a control means connected with the aircraft and the movable member to change the position of the latter, the spring means and the directional control member, and manually operable directional control means connected with the directional control member to move the latter against the resistance of the spring means.

2. A trim and directional control for rotary wing aircraft having a universally inclinable azimuth plate for pitch control of the wings comprising operating means adapted to be connected between a fixed part of the aircraft and the azimuth plate, the operating means including a movable trim control member, a directional control member adapted to be connected with the azimuth plate, spring means engaging the movable trim control member and the directional control member to move the latter through the spring means upon movement of the former member, manually operable trim control means connected with the aircraft and the movable member to change the position of the latter, the spring means and the directional control member, and manually operable directional control means connected with the directional control member to move the latter against the resistance of the spring means.

3. A trim and directional control for rotary wing aircraft having a universally inclinable azimuth plate for pitch control of the wings comprising operating means adapted to be connected between a fixed part of the aircraft and the azimuth plate, the operating means including a movable trim control member, a directional control member adapted to be connected with the azimuth plate, spring means engaging the movable trim control member and the directional control member to move the latter through the spring means upon movement of the former member, trim control means connected with the aircraft and the movable member to change the position of the latter, the spring means and the directional control member including gyroscopic means to automatically adjust the position of the movable member and hence the azimuth plate relatively to the aircraft upon short term change in attitude of the aircraft and holding the azimuth plate in position in space, and manually operable directional control means connected with the directional control member to move the latter against the resistance of the spring means.

4. A trim and directional control for rotary wing aircraft having a universally inclinable azimuth plate for pitch control of the wings comprising operating means adapted to be connected between a fixed part of the aircraft and the azimuth plate, the operating means including a movable trim control member, a directional control member adapted to be connected with the azimuth plate, spring means engaging the movable trim control member and the directional control member to move the latter through the spring means upon movement of the former member, manually operable trim control means connected with the aircraft and the movable member to change the position of the latter, the spring means and the directional control member, gyroscopic means connected with the movable member to automatically adjust the position of the movable member and hence the azimuth plate with respect to the aircraft upon short term change in attitude of the latter and holding the azimuth plate in position in space, and manually operable directional control means connected with the directional control member to move the latter against the resistance of the spring means.

5. A trim and directional control for rotary wing aircraft having a universally inclinable azimuth plate for pitch control of the wings comprising a pair of operating means adapted to be connected between a fixed part of the aircraft and the azimuth plate and located 90° apart with respect to each other, each operating means including a movable trim control member, a directional control member adapted to be connected with the azimuth plate, manually operable trim control means connected with the aircraft and the movable member to change the position of the latter, gyroscopic means connected with both movable members to automatically adjust the position of both movable members and hence of the azimuth plate with respect to the aircraft upon short term change in attitude thereof and holding the azimuth plate in position in space and manually operable directional control means connected with the directional control member to move the latter against the resistance of the spring means.

6. A trim and directional control for rotary wing aircraft having a universally inclinable azimuth plate for pitch control of the wings comprising a pair of operating means adapted to be connected between a fixed part of the aircraft and the azimuth plate and located 90° apart with respect to each other, each operating means including a movable trim control member, a directional control member adapted to be connected with the azimuth plate, spring means engaging the movable trim control member and the directional control member to move the latter through the spring means upon movement of the former member, manually operable trim control means connected with the aircraft and the movable member to change the position of the latter, the spring means and the directional control member, gyroscopic means connected with both movable members to automatically adjust the position thereof and hence the azimuth plate with respect to the aircraft upon short term change in attitude thereof and holding the azimuth plate in position in space, and manually operable directional control means connected with the directional control member to move the latter against the resistance of the spring means.

7. A trim and directional control for rotary wing aircraft having a universally inclinable azimuth plate for pitch control of the wings comprising a pair of operating means adapted to be connected between a fixed part of the aircraft and the azimuth plate and located 90° apart with respect to each other, each operating means including a movable trim control member, a directional control member adapted to be connected with the azimuth plate, manually operable trim control means connected with the aircraft and the movable trim control member to change the position of the latter and the directional control member; gyroscopic means connected with both movable members to automatically change the position thereof and hence of the azimuth plate with respect to the aircraft upon short term change in attitude of the latter and holding the azimuth plate in position in space including a gyroscopic member, means to rotate the gyroscopic member, two pairs of switch means controlled by the gyroscopic member at least one of which is closed upon inclination of the aircraft, hydraulic valve means operated by each switch means, and hydraulic means connected with each pair of valves and the movable trim control member to adjust the latter upon inclination of the aircraft; and manually operable directional control means connected with the directional control member to move the latter.

8. A trim and directional control for rotary wing aircraft having a universally inclinable azimuth plate for pitch control of the wings comprising a pair of operating means adapted to be connected between a fixed part of the aircraft and the azimuth plate and located 90° apart with respect to each other, each operating means including a movable trim control member, a directional control member adapted to be connected with the azimuth plate, spring means engaging the movable trim control member and the directional control member to move the latter through the spring means upon movement of the former member, manually operable trim control means connected with the aircraft and the movable member to change the position of the latter, the spring means and the directional control member; gyroscopic means connected with both movable members to automatically change the position of both movable members and hence of the azimuth plate with respect to the aircraft upon short term change in attitude of the latter and holding the azimuth plate in position in space including a gyroscopic member, means to rotate the gyroscopic member, two pairs of switch means controlled by the gyroscopic member at least one of which is closed upon inclination of the aircraft, hydraulic valve means operated by each switch means, and hydraulic means connected with each pair of valves and the movable trim control member to adjust the latter upon inclination of the aircraft; and manually operable directional control means connected with the directional control member to move the latter against the resistance of the spring means.

9. A trim and directional control for rotary wing aircraft having a universally inclinable azimuth plate for pitch control of the wings comprising a pair of operating means adapted to be connected between a fixed part of the aircraft and the azimuth plate and located 90° apart with respect to each other, each operating means including a movable trim control member, a directional control member adapted to be connected with the azimuth plate, at least one of said members being an hydraulically operated member, spring means engaging the movable trim control member and the directional control member to move the latter through the spring means upon movement of the former member, manually operable trim control means connected with the aircraft and the movable member to change the position of the latter, the spring means and the directional control member, gyroscopic means connected with both movable members to automatically adjust the position of both movable members and hence of the azimuth plate with respect to the aircraft upon short term change in attitude of the latter and holding the azimuth plate in position in space, manually operable directional control means connected with the directional control member to move the latter against the resistance of the spring means, and at least one of the manually operable control means being hydraulically operated.

10. A trim and directional control of rotary wing aircraft having a universally inclinable azimuth plate for pitch control of the wings comprising a pair of operating means adapted to be connected between a fixed part of the aircraft and the azimuth plate and located 90° apart with respect to each other, each operating means including a movable trim control member, a directional control member adapted to be connected with the azimuth plate, at least one of said members being an hydraulically operated member, spring means engaging the movable trim control member and the directional control member to move the latter through the spring means upon movement of the former member, manually operable trim control means connected with the aircraft and the movable member to change the position of the latter, the spring means and the directional control member; gyroscopic means connected with both movable members to automatically adjust the position of both movable members and hence of the azimuth plate with respect to the aircraft upon short term change in attitude of the latter to hold the azimuth plate in position in space, including a gyroscopic member, means to rotate the gyroscopic member, two pairs of switch means controlled by the gyroscopic member at least one of which is closed upon inclination of the aircraft, hydraulic valve means operated by each switch means, and hydraulic means connected with each pair of valves and the movable trim control member to adjust the latter upon inclination of the aircraft; and manually operable directional control means connected with the directional control member to move the latter against the resistance of the spring means, and at least one of the manually operable control means being hydraulically operated.

11. A trim and directional control for rotary wing aircraft having a universally inclinable azimuth plate or pitch control of the wings comprising a pair of operating means adapted to be connected between a fixed part of the aircraft and the azimuth plate and located 90° apart with respect to each other, each operating means including a movable trim control member, a directional control member adapted to be connected with the azimuth plate and connected with the movable trim control member to move the member with the latter, and manually operable directional control means connected with the directional control member to move the same independently, and automatically operable trim control means connected with the aircraft and the movable members to change the positions of the latter and their directional control member including cage means mounted for inclination with respect to the aircraft, gyroscopic means mounted upon the aircraft for universal inclination with respect thereto and located within the cage means, means to drive the gyroscopic means, dampers connected with the gyroscopic means which are sufficiently soft to render the gyroscopic means insensitive to short term changes of attitude of the aircraft and yet change its inclination to follow long term changes in attitude, four switch means carried by the cage means and at least one of which is operated by the gyroscopic means upon inclination of the aircraft in any direction, and a pair of trim control means for each movable trim control member and each controlled by switch means upon inclination of the aircraft.

12. A trim and directional control for rotary wing aircraft having a universally inclinable azimuth plate for pitch control of the wings comprising a pair of operating means adapted to be connected between a fixed part of the aircraft and the azimuth plate and located 90° apart with respect to each other, each operating means including a movable trim control member, a directional control member adapted to be connected with the azimuth plate and connected with the movable trim control member to move with the latter, manually operated directional control means connected with the directional control member to move the same independently; automatically operable trim control means connected with the aircraft and the movable members to change the positions of the latter, their spring means and their directional control member including cage means mounted for inclination with respect to the aircraft, gyroscopic means mounted upon the aircraft for universal inclination with respect thereto and located within the cage means, means to drive the gyroscopic means, dampers connected with the gyroscopic means such that the gyroscopic means is insensitive to a short term change of attitude of the attitude of the aircraft but changes its inclination upon long term change in attitude, four switch means carried by the cage means and at least one of which is closed by the gyroscopic means upon inclination of the aircraft in any direction, and a pair of trim control means for each movable trim control member and each controlled by a switch means to adjust the position of at least one trim control member upon inclination of the aircraft; and manually operable trim control means to independently change the position of the cage means.

13. A trim and directional control for rotary wing aircraft having a universally inclinable azimuth plate for pitch control of the wings comprising a pair of operating means adapted to be connected between a fixed part of the aircraft and the azimuth plate and located 90° apart with respect to each other, each operating means including a movable trim control member, a directional control member adapted to be connected with the azimuth plate, spring means engaging the movable trim control member and the directional control member to move the latter through the spring means upon movement of the former member, manually operated directional control means connected with the directional control member to move the same independently; automatically operable trim control means connected with the aircraft and the movable members to change the positions of the latter, their spring means and their directional control member including cage means mounted for inclination with respect to the aircraft, gyroscopic means mounted upon the aircraft for universal inclination with respect thereto and located within the cage means, means to drive the gyroscopic means, dampers connected with the gyroscopic means which render the latter insensitive to a short term change of attitude of the aircraft but change its inclination upon long term change in attitude, four switch means carried by the cage means and at least one of which is operated by the gyroscopic means upon inclination of the aircraft in any direction, and a pair of trim control means for each movable trim control member and each controlled by a switch means to adjust the position of at least one trim control member upon inclination of the aircraft.

14. A trim and directional control for rotary wing aircraft having a universally inclinable azimuth plate for pitch control of the wings comprising a pair of operating means adapted to be connected between a fixed part of the aircraft and the azimuth plate and located 90° apart with respect to each other, each operating means including a movable trim control member, a directional control member adapted to be connected with the azimuth plate, spring means engaging the movable trim control member and the directional control member to move the latter through the spring means upon movement of the former member, manually operated directional control means connected with the directional control member to move the same independently; automatically operable trim control means connected with the aircraft and the movable members to change the positions of the latter, their spring means and their directional control members including cage means mounted for inclination with respect to the aircraft, gyroscopic means mounted upon the aircraft for universal inclination with respect thereto and located within the cage means, dampers connected with the gyroscopic means which renders the latter insensitive to a short term change of attitude of the aircraft but change its inclination upon long term change in attitude, four switch means carried by the cage means and at least one of which is closed by the gyroscopic means upon inclination of the aircraft in any direction, and a pair of trim control means for each movable trim control member and each controlled by a switch means to adjust the position of at least one trim control member upon inclination of the aircraft; and manually operable trim control means connected with the cage means to independently adjust the position of the latter.

15. A gyroscopic trim control for rotary wing aircraft having a universally inclinable azimuth plate for pitch control of the wings comprising a movable trim control member adapted to be connected to a fixed part of the aircraft and to the azimuth plate, cage means adapted to be mounted upon the aircraft for inclination with respect thereto, gyroscopic means mounted upon the aircraft for universal inclination with respect thereto, means to drive the gyroscopic means, dampers connected with the gyroscopic means which render the latter insensitive to a short term change of attitude of the aircraft but change its inclination upon long term change in attitude of the latter, a pair of switch means carried by the cage means and operated upon a small movement of the cage means relatively to the gyroscopic means to close one of the switches of the pair, and means operated by each switch means and connected with the movable trim control member to adjust the latter and hence the azimuth plate upon inclination of the aircraft.

16. A gyroscopic trim control for rotary wing aircraft having a universally inclinable azimuth plate for pitch control of the wings comprising a movable trim control member adapted to be connected to a fixed part of the aircraft and to the azimuth plate, cage means adapted to be mounted upon the aircraft for inclination with respect thereto, gyroscopic means mounted upon the aircraft for universal inclination with respect thereto, means to drive the gyroscopic means, dampers connected with the gyroscopic means such that the latter is insensitive to a short term change of attitude of the aircraft but change its inclination upon long term change in attitude of the latter, a pair of switch means carried by the cage means and operated upon a small movement of the cage means relatively to the gyroscopic means to close one of the switches of the pair, means operated by each switch means and connected with the movable trim control member to adjust the latter, the cage means and hence the azimuth plate upon inclination of the aircraft, and manually operable trim control means connected with the cage means to move the same.

17. A gyroscopic trim control for rotary wing aircraft having a universally inclinable azimuth plate for pitch control of the wings comprising a movable trim control member adapted to be connected to a fixed part of the aircraft and to the azimuth plate, cage means adapted to be mounted upon the aircraft for inclination with respect thereto, gyroscopic means mounted upon the aircraft for universal inclination with respect thereto, means to drive the gyroscopic means, dampers connected with the gyroscopic means such that the latter is insensitive to a short term change of attitude of the aircraft but change its inclination upon long term change in attitude of the latter, a pair of switch means carried by the cage means and operated upon a small movement of the cage means relatively to the gyroscopic means to close one of the switches of the pair, hydraulic valve means operated by each switch means, and hydraulic means connected with each pair of valves and the movable trim control member to adjust the latter, the cage means and hence the azimuth plate upon inclination of the aircraft.

18. A gyroscopic trim control for rotary wing aircraft having a universally inclinable azimuth plate for pitch control of the wings comprising a movable trim control member adapted to be connected to a fixed part of the aircraft and to the azimuth plate, cage means adapted to be mounted upon the aircraft for inclination with respect thereto, gyroscopic means mounted upon the aircraft for universal inclination with respect thereto, means to drive the gyroscopic means, dampers connected with the gyroscopic means such that the latter is insensitive to a short term change of attitude of the aircraft but changes its inclination upon long term change in attitude of the latter, a pair of switch means carried by the cage means and operated upon a small movement of the cage means relatively to the gyroscopic means to close one of the switches of the pair, hydraulic valve means operated by each switch means, hydraulic means connected with valves and the movable trim control member to adjust the latter, the cage means and hence the azimuth plate upon inclination of the aircraft, and manually operable trim control means connected with the cage means to initially move the same.

19. A gyroscopic trim control for rotary wing aircraft having a universally inclinable azimuth plate for pitch control of the wings comprising a pair of movable control members adapted to be connected to a fixed part of the aircraft and to the azimuth plate 90° apart with respect to each other, cage means adapted to be mounted upon the aircraft for inclination with respect thereto, gyroscopic means mounted upon the aircraft for universal inclination with respect thereto, means to drive the gyroscopic means, dampers connected with the gyroscopic means such that the latter is insensitive to a short term change of attitude of the aircraft but changes its inclination upon long term change in attitude of the latter, at least one pair of switch means carried by the cage means and operated upon a small movement of the cage means relatively to the gyroscopic means to close one of the switches of the pair, and means operated by each switch means and connected with the movable trim control member to adjust the latter, the cage means and hence the azimuth plate upon inclination of the aircraft.

20. A gyroscopic trim control for rotary wing aircraft having a universally inclinable azimuth plate for pitch control of the wings comprising a pair of movable trim control members adapted to be connected to a fixed part of the aircraft and to the azimuth plate 90° apart with respect to each other, cage means adapted to be mounted upon the aircraft for inclination with respect thereto, gyroscopic means mounted upon the aircraft for universal inclination with respect thereto, means to drive the gyroscopic means, dampers connected with the gyroscopic means such that the latter is insensitive to a short term change of attitude of the aircraft but changes its inclination upon long term change in attitude of the latter, at least one pair of switch means carried by the cage means and operated upon a small movement of the cage means relatively to the gyroscopic means to close one of the switches of the pair, means operated by each switch means and connected with the movable trim control member to adjust the latter and hence the azimuth plate upon inclination of the aircraft, and manually operable trim control means connected with the cage means to move the same.

21. A gyroscopic trim control for rotary wing aircraft having a universally inclinable azimuth plate for pitch control of the wings comprising a pair of movable trim control members adapted to be connected to a fixed part of the aircraft and to the azimuth plate 90° apart with respect to each other, cage means adapted to be mounted upon the aircraft for inclination with respect thereto, gyroscopic means mounted upon the aircraft for universal inclination with respect thereto, means to drive the gyroscopic means, dampers connected with the gyroscopic means such that the latter is insensitive to a short term change of attitude of the aircraft but changes its inclination upon long term change in attitude of the latter, at least one pair of switch means carried by the cage means and operated upon a small movement of the cage means relatively to the gyroscopic means to close one of the switches of the pair, hydraulic valve means operated by each switch means, and hydraulic means connected with each pair of valves and the movable trim control member to adjust the latter, the cage means and hence the azimuth plate upon inclination of the aircraft.

22. A gyroscopic trim control for rotary wing aircraft having a universally inclinable azimuth plate for pitch control of the wings comprising a pair of movable trim control members adapted to be connected to a fixed part of the aircraft and to the azimuth plate 90° apart with respect to each other, cage means adapted to be mounted upon the aircraft for inclination with respect thereto, gyroscopic means mounted upon the aircraft for universal inclination with respect thereto, means to drive the gyroscopic means, dampers connected with the gyroscopic means such that the latter is insensitive to a short term change of attitude of the aircraft but changes its inclination upon long term change in attitude of the latter, at least one pair of switch means carried by the cage means and operated upon a small movement of the cage means relatively to the gyroscopic means to close one of the switches of the pair, hydraulic valve means operated by each switch means, hydraulic means connected with each pair of valves and the movable trim control member to adjust the latter, the cage means and hence the azimuth plate upon inclination of the aircraft, and manually operable trim control means connected with the cage means to move the same.

GLIDDEN S. DOMAN.

REFERENCES CITED

The following references are of record in the file of this patent:

UNITED STATES PATENTS

| Number | Name | Date |
|---|---|---|
| 1,921,805 | Bordoni | Aug. 8, 1933 |
| 2,023,105 | Smith | Dec. 3, 1935 |
| 2,368,698 | Young | Feb. 6, 1945 |
| 2,384,516 | Young | Sept. 11, 1945 |
| 2,389,798 | Main | Nov. 27, 1945 |
| 2,394,846 | Cox | Feb. 12, 1946 |